United States Patent
Jiang-Häfner

(10) Patent No.: US 9,812,982 B2
(45) Date of Patent: Nov. 7, 2017

(54) METHOD IN, APPARATUS FOR, AND INTERFACE ARRANGEMENT BETWEEN AN ALTERNATING CURRENT POWER SYSTEM AND A DIRECT CURRENT POWER SYSTEM

(71) Applicant: ABB SCHWEIZ AG, Baden (CH)

(72) Inventor: Ying Jiang-Häfner, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/518,626

(22) PCT Filed: Oct. 30, 2014

(86) PCT No.: PCT/EP2014/073270
§ 371 (c)(1),
(2) Date: Apr. 12, 2017

(87) PCT Pub. No.: WO2016/066196
PCT Pub. Date: May 6, 2016

(65) Prior Publication Data
US 2017/0229976 A1    Aug. 10, 2017

(51) Int. Cl.
*H02J 5/00* (2016.01)
*H02M 7/12* (2006.01)
(Continued)

(52) U.S. Cl.
CPC .............. *H02M 7/12* (2013.01); *G05B 15/02* (2013.01); *H02H 7/1255* (2013.01);
(Continued)

(58) Field of Classification Search
CPC  H02H 3/32; H02H 3/34; H02H 3/347; H02H 9/02; H02H 7/16; H02H 7/125;
(Continued)

(56) References Cited

U.S. PATENT DOCUMENTS 4,589,050 A    5/1986   Cutler et al.
5,510,591 A    4/1996   Tremblay et al.
(Continued)

FOREIGN PATENT DOCUMENTS

CN    102412568 B    12/2013
FR    2 711 279 A1    4/1995
(Continued)

*Primary Examiner* — Harry Behm
(74) *Attorney, Agent, or Firm* — Birch, Stewart, Kolasch & Birch, LLP

(57) ABSTRACT

A method and apparatuses for handling delayed zero crossing in fault current through a circuit breaker are disclosed. An interface arrangement is configured to couple an alternating current, AC, power system with a direct current, DC, power system, or vice versa. The interface arrangement includes at least one converter for conversion of AC power to DC power, or vice versa, which includes a DC side for coupling of the converter to the DC power system and an AC side for coupling of the converter to the AC power system. A circuit breaker is arranged in a current path between the AC side of the at least one converter and the AC power system. There may be a risk of delayed zero crossing in fault current occurring in case a fault occurs in a predefined portion of the interface arrangement. If a fault is sensed to occur in the interface arrangement within the predefined portion of the interface arrangement, opening of contacts of the circuit breaker can be delayed by a selected delay time period, compared to if the fault would have been within a portion of the interface arrangement different from the predefined portion.

18 Claims, 3 Drawing Sheets

(51) Int. Cl.
*H02M 1/084* (2006.01)
*H02H 7/125* (2006.01)
*G05B 15/02* (2006.01)
*H02H 3/34* (2006.01)
*H02H 9/02* (2006.01)
*H02M 7/483* (2007.01)

(52) U.S. Cl.
CPC .............. *H02M 1/084* (2013.01); *H02H 3/34* (2013.01); *H02H 9/02* (2013.01); *H02J 5/00* (2013.01); *H02M 2007/4835* (2013.01)

(58) Field of Classification Search
CPC ........... H02H 7/1257; H02J 5/00; H01H 7/16; H02M 2007/4835

See application file for complete search history.

(56) References Cited

U.S. PATENT DOCUMENTS

| | | | |
|---|---|---|---|
| 5,617,012 A | 4/1997 | Murakami | |
| 5,986,903 A | 11/1999 | Svensson et al. | |
| 8,072,715 B2 | 12/2011 | Dusang, Jr. et al. | |
| 2006/0007627 A1* | 1/2006 | Lewis | H03K 17/6874 361/160 |
| 2008/0084643 A1* | 4/2008 | Flottemesch | H02J 3/34 361/93.2 |
| 2014/0226247 A1* | 8/2014 | Gaxiola | H01H 33/596 361/100 |
| 2015/0340859 A1* | 11/2015 | Barker | H02H 3/07 361/62 |

FOREIGN PATENT DOCUMENTS

| | | |
|---|---|---|
| JP | 2000-175454 A | 6/2000 |
| JP | 2003-284353 A | 10/2003 |
| JP | 2010-273478 A | 12/2010 |
| WO | WO 2011/150963 A1 | 12/2011 |

* cited by examiner

US 9,812,982 B2

METHOD IN, APPARATUS FOR, AND INTERFACE ARRANGEMENT BETWEEN AN ALTERNATING CURRENT POWER SYSTEM AND A DIRECT CURRENT POWER SYSTEM

TECHNICAL FIELD

The present invention generally relates to the field of power transmission systems, e.g. High Voltage Direct Current (HVDC) power transmission systems. Specifically, the present invention relates to a method and apparatuses for handling delayed zero crossing in fault current through a circuit breaker in an interface arrangement between an alternating current (AC) power system and a direct current (DC) power system, e.g. a converter station between an AC power system and a DC power system.

BACKGROUND

HVDC power transmission has become increasingly important due to increasing need for power supply or delivery and interconnected power transmission and distribution systems. Power systems such as electrical power distribution or transmission systems generally include a protection system for protecting, monitoring and controlling the operation and/or functionality of other components included in the power system, which other components hence may be referred to as protected units. Such protection systems may for example be able to detect short circuits, overcurrents and overvoltages in power lines, transformers and/or other parts or components of the power system. The protection systems can include protection equipment such as circuit breakers for isolating any possible faults for example occurring in power transmission and distribution lines by opening or tripping the circuit breakers. After the fault has been cleared, e.g. by performing repairs and/or maintenance on the component in which the fault has been detected, the power flow can be restored by closing the circuit breakers.

Interface arrangements are known to be connected between an AC power system and a DC power system. Such an arrangement typically includes a converter, such as a voltage source converter, for conversion of AC power to DC power, or vice versa. The interface arrangement has a DC side for coupling to the DC power system and an AC side for coupling to the AC power system. The arrangement often includes a transformer having a primary side connected to the AC system and a secondary side for coupling to the converter.

For example in a HVDC power system, there is generally included an interface arrangement including or constituting a HVDC converter station, which is a type of station configured to convert high voltage DC to AC, or vice versa. An HVDC converter station may comprise a plurality of elements such as the converter itself (or a plurality of converters connected in series or in parallel), one or more transformers, capacitors, filters, and/or other auxiliary elements. Converters may comprise a plurality of solid-state based devices such as semiconductor devices and may be categorized as line-commutated converters, using e.g. thyristors as switches, or voltage source converters, using transistors such as insulated gate bipolar transistors (IGBTs) as switches (or switching devices). A plurality of solid-state semiconductor devices such as thyristors or IGBTs may be connected together, for instance in series, to form a building block, or cell, of an HVDC converter. The converter cell may in alternative be referred to as a (HVDC) converter valve.

In the interface arrangement there may also be provided an AC circuit breaker, which e.g. may be arranged between the primary windings of the transformer and the AC power system, for protecting the converter in case of occurrence of a fault by isolating the converter from the AC power system. However, in some cases, the fault current may contain a relatively large DC component, which may entail a relatively long delay before the fault current through the AC circuit breaker crosses zero, during which delay the AC circuit breaker cannot interrupt the fault current. Such a situation is in general undesirable and may be referred to as delayed zero-crossing. Delayed zero-crossing may make opening of the AC circuit breaker difficult or even impossible, and may lead to degradation or even malfunction of the AC circuit breaker.

SUMMARY

For example in interface arrangements such as converter stations with asymmetrical monopole configuration or bipole configuration (which essentially is a combination of two asymmetrical monopole configurations), there may be risk of delayed zero crossing in fault current occurring during phase to ground faults, in particular when such faults occur in a current path on the AC side between the transformer and the AC side of the converter or the DC side of the converter. In some cases, there may be risk of delayed zero crossing in fault current occurring during phase to ground faults, also in interface arrangements such as converter stations with symmetrical monopole configuration, e.g. after occurrence of a DC pole to ground fault.

For mitigating delayed zero crossing in fault current, an auxiliary resistor on the AC side of the transformer may for example be employed. The auxiliary resistor may be connected to the AC side of the transformer via an auxiliary AC circuit breaker. If a converter AC bus fault is detected, the auxiliary AC circuit breaker can be closed, causing the converter AC bus to be short-circuited to earth (ground) via the resistor. In this manner, a symmetrical current component may be added to the fault current, which may facilitate or ensure a relatively fast appearance of zero-crossings in the fault current through the 'main' AC circuit breaker, allowing the main AC circuit breaker to interrupt the fault current. The auxiliary AC circuit breaker should preferably be closed before the main AC circuit breaker opens. Such a solution or similar solutions for handling delayed zero crossing in fault current however in general require that additional auxiliary equipment is installed in the interface arrangement (e.g., a converter station).

In view of the above, a concern of the present invention is to provide means for improving protection of a 'main' AC circuit breaker in an interface arrangement between an AC power system and a DC power system, e.g. a converter station between an AC power system and a DC power system, with respect to handling of different faults that may occur in the interface arrangement.

A further concern of the present invention is to provide means for handling delayed zero crossing in fault current through a 'main' AC circuit breaker in an interface arrangement between an AC power system and a DC power system, e.g. a converter station between an AC power system and a DC power system.

A further concern of the present invention is to provide means for handling delayed zero crossing in fault current through a 'main' AC circuit breaker in an interface arrangement between an AC power system and a DC power system, e.g. a converter station between an AC power system and a DC power system, while requiring no or at least less additional auxiliary equipment installed in the interface arrangement.

A further concern of the present invention is to provide means for improving protection of a 'main' AC circuit breaker in an interface arrangement between an AC power system and a DC power system, e.g. a converter station between an AC power system and a DC power system, in case of occurrence of a phase to ground fault, which possibly may occur in a current path on the AC side between a transformer and the AC side of a converter or the DC side of the converter.

A further concern of the present invention is to provide means for handling delayed zero crossing in fault current through a 'main' AC circuit breaker in an interface arrangement between an AC power system and a DC power system, e.g. a converter station between an AC power system and a DC power system, in case of occurrence of a phase to ground fault, which possibly may occur in a current path on the AC side between a transformer and the AC side of a converter or the DC side of the converter.

To address at least one of these concerns and other concerns, a control and processing module, a computer program product, a method in an interface arrangement, and an interface arrangement in accordance with the independent claims are provided. Preferred embodiments are defined by the dependent claims.

According to a first aspect, there is provided a control and processing module for use in an interface arrangement which is configured to couple an AC power system with DC power system, or vice versa. The interface arrangement comprises at least one converter for conversion of AC power to DC power, or vice versa. The at least one converter comprises a DC side for coupling of the converter to the DC power system and an AC side for coupling of the converter to the AC power system. The interface arrangement comprises a circuit breaker arranged in a current path between the AC side of the at least one converter and the AC power system. The circuit breaker is configured to controllably effect discontinuation of flow of current in the current path upon opening of contacts of the circuit breaker. The interface arrangement comprises a fault sensing unit configured to sense a fault occurring in the interface arrangement. The fault sensing unit is communicatively coupled to the control and processing module. The control and processing modules is configured to control operation of the circuit breaker at least with respect to opening of the circuit breaker, wherein the control and processing module is configured to open the contacts of the circuit breaker if there is determined to be a fault occurring in the interface arrangement. The control and processing module is configured to, if a fault in the interface arrangement as sensed by the fault sensing unit occurs within a predefined portion of the interface arrangement, delay opening of the contacts of the circuit breaker by a selected delay time period, compared to if the fault would have been within a portion of the interface arrangement different from the predefined portion.

For example in case the interface arrangement is configured according to an asymmetrical monopole configuration or a bipole configuration, there may be risk of delayed zero crossing in fault current occurring at least in case there is a phase to ground fault in the interface arrangement, for example occurring in a current path on the AC side between a transformer on the AC side and the AC side of the converter or the DC side of the converter.

The first aspect provides means for handling any delayed zero crossing in fault current through the circuit breaker that may occur. By means of the first aspect, if delayed zero crossing in fault current through the circuit breaker does occur, there may be less or no risk of damage to the circuit breaker or degradation of the function of the circuit breaker.

In general, there may be a risk of delayed zero crossing in fault current in case there is a fault occurring in a predefined portion of the interface arrangement. As mentioned above, the predefined portion may for example include or be constituted by a current path on the AC side between a transformer on the AC side and the AC side of the converter or the DC side of the converter. Thus, in case there is a fault in such a predefined portion (which predefined portion hence may be associated with a (possibly significant) risk that delayed zero crossing occurs in fault current through the circuit breaker) the opening of the (contacts of) the circuit breaker can be delayed, compared to if any other fault occurs, i.e. if the fault occurs elsewhere in the interface arrangement.

According to one example for illustrating principles of embodiments of the present invention, the circuit breaker may be configured with individual phase control. That is, the circuit breaker may be able to controllably effect discontinuation of flow of current in each of a plurality of phases or current paths upon opening of contacts of the circuit breaker, independently of the other phases or current paths. If a fault occurs in a predefined portion of the interface arrangement, e.g. between a transformer on the AC side and the AC side of the converter or the DC side of the converter, there may be a risk that delayed zero crossing occurs in fault current through the circuit breaker. If such a fault is sensed for at least one conductor of the plurality of conductors, opening or tripping of the circuit breaker so as to effect discontinuation of flow of current in the at least one conductor can be delayed by a selected delay time period. The delay is as compared to if the fault would have been within a portion of the interface arrangement different from the predefined portion. For the other conductors (for which there may be no fault occurring), there may be no delay in opening or tripping of the circuit breaker so as to effect discontinuation of flow of current in the respective conductors.

As indicated above, the predefined portion of the interface arrangement may be between a transformer on the AC side and the AC side of the converter or the DC side of the converter. It has been confirmed by means of power system simulations (e.g. using PSCAD developed by Manitoba HVDC Research Centre, 211 Commerce Drive, Winnipeg, Manitoba, Canada R3P 1A3) that by delaying opening of the contacts of the circuit breaker by a selected delay time period if a fault in the interface arrangement occurs within the predefined portion of the interface arrangement, it may be ensured that the duration of the arcing between the contacts of the circuit breaker is no longer than two (current) cycles. This may safeguard the operation of the circuit breaker and mitigate or even avoid degradation of the function of the circuit breaker. Thereby, by delaying opening of the contacts of the circuit breaker by a selected delay time period if a fault in the interface arrangement occurs within the predefined portion of the interface arrangement, the circuit breaker and e.g. the converter can be protected in case of a delayed zero-crossing in fault current occurs.

In the context of the present application, by two entities being communicatively coupled it is meant that there is a communication path between the two entities which allows for transferring information, data, signals, etc., between the two entities. The communication path may be wired and/or wireless, implemented according to wired or wireless communication techniques known in the art.

According to a second aspect, there is provided a computer program product which is configured to be executed in a control and processing module for use in an interface arrangement configured to couple an AC power system with a DC power system, or vice versa. The interface arrangement comprises at least one converter for conversion of AC power to DC power, or vice versa. The at least one converter comprises a DC side for coupling of the converter to the DC power system and an AC side for coupling of the converter to the AC power system. The interface arrangement comprises a circuit breaker arranged in a current path between the AC side of the at least one converter and the AC power system. The circuit breaker is configured to controllably effect discontinuation of flow of current in the current path upon opening of contacts of the circuit breaker. The interface arrangement comprises a fault sensing unit configured to sense a fault occurring in the interface arrangement. The fault sensing unit is communicatively coupled to the control and processing module. The computer program product comprises computer-readable means carrying computer program code configured to, when executed in the control and processing module, control operation of the circuit breaker at least with respect to opening of the circuit breaker, wherein the contacts of the circuit breaker are opened if there is determined to be a fault occurring in the interface arrangement. The computer program code is configured to, when executed in the control and processing module, if a fault in the interface arrangement as sensed by the fault sensing unit occurs within a predefined portion of the interface arrangement, delay opening of the contacts of the circuit breaker by a selected delay time period compared to if the fault would have been within a portion of the interface arrangement, different from the predefined portion.

According to a third aspect, there is provided a method for use in an interface arrangement configured to couple an AC power system with a DC power system, or vice versa. The interface arrangement comprises at least one converter for conversion of AC power to DC power, or vice versa. The at least one converter comprises a DC side for coupling of the converter to the DC power system and an AC side for coupling of the converter to the AC power system. The interface arrangement comprises a circuit breaker arranged in a current path between the AC side of the at least one converter and the AC power system. The circuit breaker is configured to controllably effect discontinuation of flow of current in the current path upon opening of contacts of the circuit breaker. A fault may be sensed that occurs in the interface arrangement. Operation of the circuit breaker is controlled at least with respect to opening of the circuit breaker. The contacts of the circuit breaker are opened if there is determined to be a fault occurring in the interface arrangement. If a fault in the interface arrangement is sensed to occur within a predefined portion of the interface arrangement, opening of the contacts of the circuit breaker is delayed by a selected delay time period, compared to if the fault would have been within a portion of the interface arrangement different from the predefined portion.

According to a fourth aspect, there is provided an interface arrangement configured to couple an AC power system with a DC power system, or vice versa. The interface arrangement comprises at least one converter for conversion of AC power to DC power, or vice versa. The at least one converter comprises a DC side for coupling of the converter to the DC power system and an AC side for coupling of the converter to the AC power system. The interface arrangement comprises a circuit breaker arranged in a current path between the AC side of the at least one converter and the AC power system. The circuit breaker is configured to controllably effect discontinuation of flow of current in the current path upon opening of contacts of the circuit breaker. The interface arrangement comprises a fault sensing unit configured to sense a fault occurring in the interface arrangement. The interface arrangement comprises a control and processing module according to the first aspect, which is communicatively coupled to the fault sensing unit.

According to a fifth aspect, there is provided a converter station configured to couple an AC power system with a DC power system. The converter station includes or is constituted by an interface arrangement according to the fourth aspect.

According to a sixth aspect, there is provided a power system which includes an AC power system and a DC power system. The power system according to the sixth aspect comprises an interface arrangement according to the fourth aspect, configured to couple the AC power system with the DC power system.

The interface arrangement may comprise a transformer comprising a primary side for coupling of the transformer to the AC power system and a secondary side for coupling of the transformer to the at least one converter. The circuit breaker may for example be arranged in a current path between the transformer and the AC power system. According to an example, the predefined portion of the interface arrangement may comprise a current path between the secondary side of the transformer and the AC side of the at least one converter.

The fault in the interface arrangement, as sensed by the fault sensing unit, may for example be or include a phase to ground fault.

According to an example, the interface arrangement may comprise a multi-phase current path comprising a plurality of conductors for coupling the AC power system with the DC power system. The fault sensing unit may be configured to sense a fault in any one of the plurality of conductors. The circuit breaker may be configured to controllably effect discontinuation of flow of current in each of the plurality of conductors upon opening of contacts of the circuit breaker, independently of the other ones of the plurality of conductors. The control and processing module may be configured to, if a fault in the interface arrangement as sensed by the fault sensing unit occurs in a current path in the predefined portion of the interface arrangement for at least one conductor of the plurality of conductors, delay opening of the contacts of the circuit breaker so as to effect discontinuation of flow of current in the at least one conductor by a selected delay time period compared to if the fault would have been within a portion of the interface arrangement different from the predefined portion. The selected delay time period may for example be between about 20 ms and 100 ms.

The fault sensing unit may for example comprise a current sensing unit.

The current sensing unit may be configured to sense a current at the DC side of the at least one converter and/or at the AC side of the at least one converter, and sense a current between the AC power system and the DC side of the at least one converter, at a different position than the sensing of current at the DC side of the at least one converter and/or at the AC side of the at least one converter. According to an example, the current sensing unit may comprise a first current sensor configured to sense a current at the DC side of the at least one converter and/or at the AC side of the at least one converter, and a second current sensor configured to sense a current at a different position than the first current sensor, between the AC power system and the DC side of the at least one converter.

The fault sensing unit may for example be configured to determine a differential current based on the currents sensed by the current sensing unit. The fault sensing unit may be configured to, based on the differential current, determine that there is a fault in the interface arrangement. According to an example, the fault sensing unit may be configured to determine that there is a fault in the interface arrangement on a condition that a magnitude of the differential current exceeds a predefined differential current threshold value for a predefined period of time.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the present invention to those skilled in the art.

Figure 1:
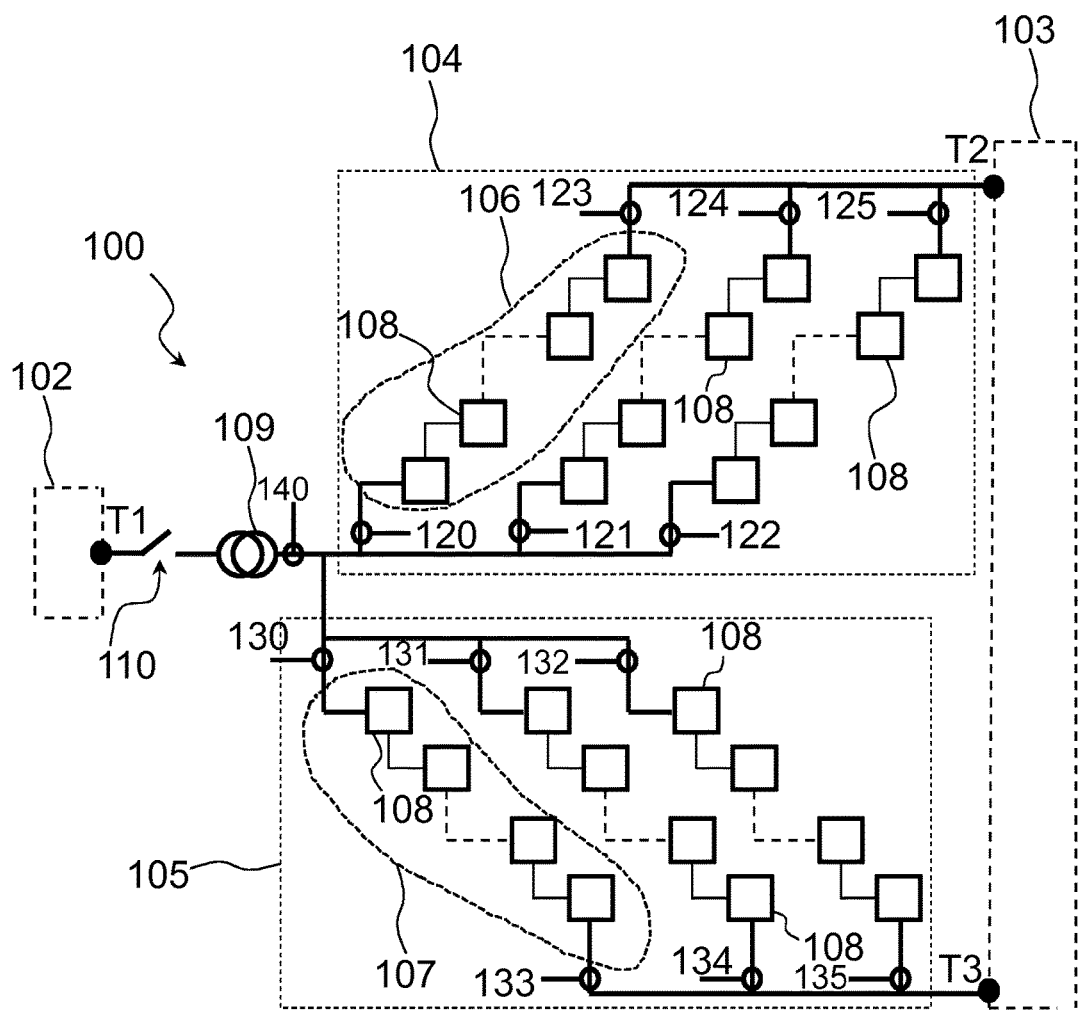
FIG. 1 is a schematic circuit diagram of an interface arrangement according to an embodiment of the present invention.

FIG. 1 is a schematic circuit diagram of an interface arrangement 100 according to an embodiment of the present invention. The interface arrangement 100 is configured to couple an AC power system 102 with a DC power system 103, or vice versa. The interface arrangement 100, the AC power system 102 and the DC power system 103 may be included in or constitute a power system. The interface arrangement 100 comprises at least one converter for conversion of AC power to DC power, or vice versa, in FIG. 1 represented by two converter arms or converter cells, schematically indicated by reference numerals 104 and 105, which each has three phases 106, 107, respectively, including a plurality of series-connected converter units 108. In one or more embodiments of the present invention however, some or all of the converter units 108 may in addition or in alternative be connected for example in parallel with each other. Only one of the phases in each converter arm 104, 105 are indicated by a reference numeral 106, 107. Although four converter units 108 are represented in each of the phases 106, 107 of the converter arms 104, 105 in FIG. 1, it will be understood that a larger or smaller number of converter units may be included in the respective phases 106, 107 of the converter arms 104, 105. Only some of the converter units 108 are indicated by reference numerals in FIG. 1. Although FIG. 1 illustrates a three-phase system, comprising three conductors for coupling the AC power system 102 with the DC power system 103, it will be understood that this is according to an example. The interface arrangement 100 may in accordance with one or more embodiments of the present invention comprise a multi-phase arrangement, with two or three phases or more, or even a single-phase arrangement. Further, even though in FIG. 1 two converter arms 104, 105 are depicted, it will be appreciated that another number of converter arms may be envisaged, e.g. a single converter arm or more than two converter arms, each of which may or may not be configured such as the converter arms 104, 105 illustrated in FIG. 1.

Each converter unit 108 may include a plurality of solid-state semiconductor devices such as thyristors or IGBTs. Although FIG. 1 shows a series-connection of the converter units 108 in each (phase 106, 107) of each converter arm 104, 105, it is to be understood that at least some of the converter units 108 in each (phase 106, 107) of each converter arm 104, 105 may be connected together e.g. in parallel to form the (respective phases of the) converter arms 104, 105 or cells.

The at least one converter, or as illustrated in FIG. 1, the two converter arms 104, 105, comprises a DC side for coupling of the converter to the DC power system 103. The converter arms 104, 105 further comprises an AC side for coupling of the converter to the AC power system 102. According to the embodiment of the present invention illustrated in FIG. 1, the coupling of the converter to the DC power system 103 is by way of terminals T2 and T3, corresponding to the two converter arms 104, 105, and the coupling of the converter to the AC power system 102 is by way of terminal T1.

In accordance with the embodiment of the present invention illustrated in FIG. 1, the interface arrangement 100 comprises a transformer 109, which comprises a primary side for coupling of the transformer 109 to the AC power system 102 and a secondary side for coupling of the transformer 109 to the converter (arms 104, 105). The primary side of the transformer 109 may comprise a set of primary windings, arranged to be coupled to the AC power system 102. The secondary side of the transformer 109 may comprise a set of secondary windings, arranged to be coupled to the converter, or converter arms 104, 105.

The interface arrangement 100 comprises a circuit breaker 110 arranged in a current path between the AC side, or AC bus, of the two converter arms 104, 105 and the AC power system 102. Hence, the circuit breaker 110 may be an AC circuit breaker. In accordance with the embodiment of the present invention illustrated in FIG. 1, the circuit breaker 110 is arranged in a current path between the transformer 109 and the AC power system 102. The circuit breaker 110 is configured to controllably effect discontinuation of flow of current in the current path upon opening of contacts of the circuit breaker 110. The contacts of the circuit breaker 110 are not shown in FIG. 1. The circuit breaker 110 may for example be arranged in a current path between the set of primary windings of the transformer 109 and the AC power system 102.

According to one or more embodiments of the present invention, the interface arrangement 100 may comprise one or more additional circuit breakers arranged in the current path between the AC side or AC bus of the two converter arms 104, 105 and the AC power system 102, e.g. for purposes of redundancy.

The circuit breaker 110 may be controllable at least with respect to opening and possibly also closing of the circuit breaker 110.

The circuit breaker 110 (and possibly any additional circuit breaker) may be a zero-crossing or zero-point extinguishing circuit breaker, which open contacts upon receiving an opening or tripping command, which may be generated or issued after detection of a fault condition or fault current within some part or portion of the power system, e.g. between the AC power system 102 and the AC side of the converter 104, 105. After opening of the contacts of the circuit breaker 110, an arc may be present between the open contacts of the circuit breaker 110 until the fault current wave form crosses zero. When the fault current wave form crosses zero, the potential energy becomes zero, and the arc is extinguished, whereby flow of current though the circuit breaker 110, and thus in the current path in which the circuit breaker 110 is arranged, can be discontinued. A fault current generally has a DC component and an AC component. If the DC component is relatively large in comparison to the AC component, there may be a relatively long time between the instant when contacts of the circuit breaker 110 have been opened and the instant when the fault current wave form crosses zero. Such a situation, which as mentioned in the foregoing may be referred to as delayed zero-crossing or missing zero-crossing, may make the circuit breaker 110 difficult or even impossible to open without risk of damage, and may lead to degradation of the function of the circuit breaker 110, as well as for example the converter 104, 105. With reference to the embodiment of the present invention illustrated in FIG. 1, there may be risk of delayed zero crossing in fault current occurring for example for phase to ground faults which may occur in a current path between the transformer 109 and the AC bus or side of the converter 104, 105, or between the transformer 109 and the DC bus or side of the converter 104, 105 (e.g. in the interface arrangement 100 close to terminals T2 and T3, respectively).

In the interface arrangement 100 there may be included equipment or components for sensing or detecting if a fault occurs in the interface arrangement 100, and also equipment or components for controlling operation of the circuit breaker 110, at least with respect to opening of the circuit breaker 110. Controlling operation of the circuit breaker 110 may for example comprise controlling the circuit breaker 110 so that it opens contacts of the circuit breaker 110 if there is determined to be a fault occurring in the interface arrangement 100.

According to one or more embodiments of the present invention, in order to reduce or avoid risk of damage to the circuit breaker 110 and possibly also for example the converter 104, 105 in case of delayed zero crossing in fault current occurring upon a fault in the interface arrangement 100, opening of the contacts of the circuit breaker 110 (possibly so as to effect discontinuation of flow of current in the respective phase in which there is a phase to ground fault) can be delayed by a selected delay time period.

Opening of the contacts of the circuit breaker 110 (possibly so as to effect discontinuation of flow of current in the respective phase in which there is a phase to ground fault) can be delayed by a selected delay time period for example in case of a phase to ground fault occurring in a current path between the transformer 109 and the AC bus or AC side of the converter 104, 105, or in a current path between the transformer 109 and the DC bus or side of the converter 104, 105 (e.g. in one of the phases or conductors).

The delay in the opening of the contacts of the circuit breaker 110 is as compared to if any other fault would be sensed or detected, for example, a fault which is not occurring in a current path between the transformer 109 and the AC bus or side of the converter 104, 105, or in a current path between the transformer 109 and the DC bus or side of the converter 104, 105.

According to one or more embodiments of the present invention, if there is determined, sensed or detected that there is a fault occurring in the interface arrangement 100 within a predefined portion of the interface arrangement 100, opening of the contacts of the circuit breaker 110 is delayed by a selected delay time period, compared to if the fault would have been within a portion of the interface arrangement 100, different from the predefined portion.

As indicated above, the predefined portion of the interface arrangement 100 may for example be a portion, zone or region between the secondary side of the transformer 109 and the DC bus or side of the converter 104, 105, or between the transformer 109 and the AC bus or AC side of the converter 104, 105. During phase to ground faults occurring between the transformer 109 and the DC bus or side of the converter 104, 105, or between the secondary side of the transformer 109 and the AC bus or AC side of the converter 104, 105, there may be a risk of delayed zero crossing in the fault current through the circuit breaker 110. Thus, by delaying opening of the contacts of the circuit breaker 110 by a selected delay time period there is determined, sensed or detected that there is a fault occurring in the interface arrangement 100 within the predefined portion of the interface arrangement 100, the operation of the circuit breaker 110 may be safeguarded, and degradation of the function of the circuit breaker 110 may be mitigated or even eliminated.

Equipment or components for sensing or detecting if a fault occurs in the interface arrangement 100 may include a fault sensing unit (not shown in FIG. 1, cf. FIG. 2), which in accordance with the embodiment of the present invention illustrated in FIG. 1 may comprise at least one current sensing unit (not shown in FIG. 1, see FIG. 2), and which is configured to sense a current at the DC side of the converter, which in FIG. 1 is represented by the two converter arms 104 and 105, and/or at the AC side of the converter 104, 105. The fault sensing unit is further configured to sense a current between the AC power system 102 and the DC side of the converter 104, 105, at a different position than where current at the DC side of the converter 104, 105 and/or at the AC side of the converter 104, 105 was sensed. According to an example, the current sensing unit may comprise at least a first current sensor, configured to sense a current at the DC side of the converter and/or at the AC side of the converter, and a second current sensor, configured to sense a current at a different position than the first current sensor, between the AC power system 102 and the DC side of the converter.

For example, for converter (arm) 104, current may be sensed at the AC side thereof by current sensors arranged at positions indicated by 120, 121 and 122, corresponding to each of the three phases or conductors of the converter (arm) 104. In alternative or in addition, for converter (arm) 104, current may be sensed at the DC side thereof by current sensors arranged at positions indicated by 123, 124, 125, corresponding to each of the three phases or conductors of the converter (arm) 104.

Also according to an example, for converter (arm) 105, current may be sensed at the AC side thereof by current sensors arranged at positions indicated by 130, 131 and 132, corresponding to each of the three phases or conductors of the converter (arm) 105. In alternative or in addition, for converter (arm) 105, current may be sensed at the DC side thereof by current sensors arranged at positions indicated by 133, 134, 135, corresponding to each of the three phases or conductors of the converter (arm) 105.

Current between the AC power system 102 and the DC side of the converter 104, 105 may according to an example be sensed by a current sensor arranged at position close to the transformer's 109 converter side, or secondary side, e.g. as indicated by 140.

As mentioned in the foregoing, if there is determined, sensed or detected that there is a fault occurring in the interface arrangement 100 within a predefined portion of the interface arrangement 100, opening of the contacts of the circuit breaker 110 can be delayed by a selected delay time period, compared to if the fault would have been within a portion of the interface arrangement 100 different from the predefined portion. According to one or more embodiments of the present invention, the selected delay time period may be between about 20 ms and 100 ms, for example about 25 ms or about 30 ms.

Delaying opening of the contacts of the circuit breaker 110 by a selected delay time period responsive to a fault occurring within a predefined portion of the interface arrangement 100 may imply that the sending of an instruction or command, which for example may be issued by a protection system or a control and processing module (cf. FIG. 2) for use in the interface arrangement 100, is delayed. The instruction or command may, depending on the capabilities and/or configuration of the circuit breaker 110, be sent directly to the circuit breaker 110 or to some entity which controls operation of the circuit breaker 110. In alternative, sending of such a message or instruction for controlling the circuit breaker 110 by the control and processing module (cf. FIG. 2) can be delayed by the selected delay time period. According to another example, the sending of the instruction or command to the circuit breaker 110 or to some entity which controls operation of the circuit breaker 110 may not be delayed as such. In that case, the instruction or command may include information or instruction that opening of the contacts of the circuit breaker 110 should not be carried out immediately upon receipt, but essentially only after the selected delay time period has expired, following receipt of the instruction or command.

Opening of the contacts of the circuit breaker 110 may according to one or more embodiments of the present invention in (substantially) all cases (i.e. irrespective of whether there is a fault occurring in the predefined portion of the interface arrangement 100 or in a different portion of the interface arrangement 100) be delayed by some predefined period, e.g. between about 2 ms to 5 ms. The predefined period may be a period of time which is reserved for identifying whether there is a fault occurring in the predefined portion of the interface arrangement 100, e.g. if there is a phase to ground fault occurring in a current path between the transformer 109 and the AC bus or side of the converter 104, 105, or between the transformer 109 and the DC bus or side of the converter 104, 105 (e.g. in the interface arrangement 100 close to terminals T2 and T3, respectively).

According to an embodiment of the present invention, the fault sensing unit may be configured to determine a differential current based on the sensed currents by the current sensing unit. Based on the differential current, which possibly may be determined for each phase or conductor in case the interface arrangement 100 is a multi-phase arrangement, there may be determined that there is a fault, e.g. a phase to ground fault, in (one or more phases in) the interface arrangement 100. For example, based on the differential current, there may be determined that there is a phase to ground fault in a current path between the transformer 109 and the AC bus or side of the converter 104, 105, or in a current path between the transformer 109 and the DC bus or side of the converter 104, 105. The fault sensing unit may be configured to determine that there is a fault in the interface arrangement 100 on a condition that a magnitude of the differential current exceeds a predefined differential current threshold value for a predefined period of time.

It will be appreciated that the fault sensing unit is not limited to detection or sensing of faults utilizing sensed current, and neither is it limited to employing differential current based fault detection or sensing. Other implementations of the fault sensing unit, in order to achieve capability or functionality of the fault sensing unit to sense a fault occurring in the interface arrangement, are contemplated and are within the scope of embodiments of the present invention. For example, voltage may be sensed at appropriate locations along the current path in the interface arrangement 100 between the AC power system 102 and the DC power system 103, e.g. between the current path and ground. According to one or more embodiments of the present invention, any fault which may occur in the interface arrangement 100 may be sensed or detected based on such sensed voltage.

The interface arrangement 100 may be included in or constitute a converter station, e.g. a HVDC converter station. The interface arrangement 100 or converter station may be configured for example according to an asymmetrical monopole configuration or a bipole configuration.

It is to be understood that various components which are not illustrated in FIG. 1 may be included in the interface arrangement 100. Such components, which thus are not shown in FIG. 1, may for example include resistors, capacitors, filters, additional transformers and/or other auxiliary elements.

Figure 2:
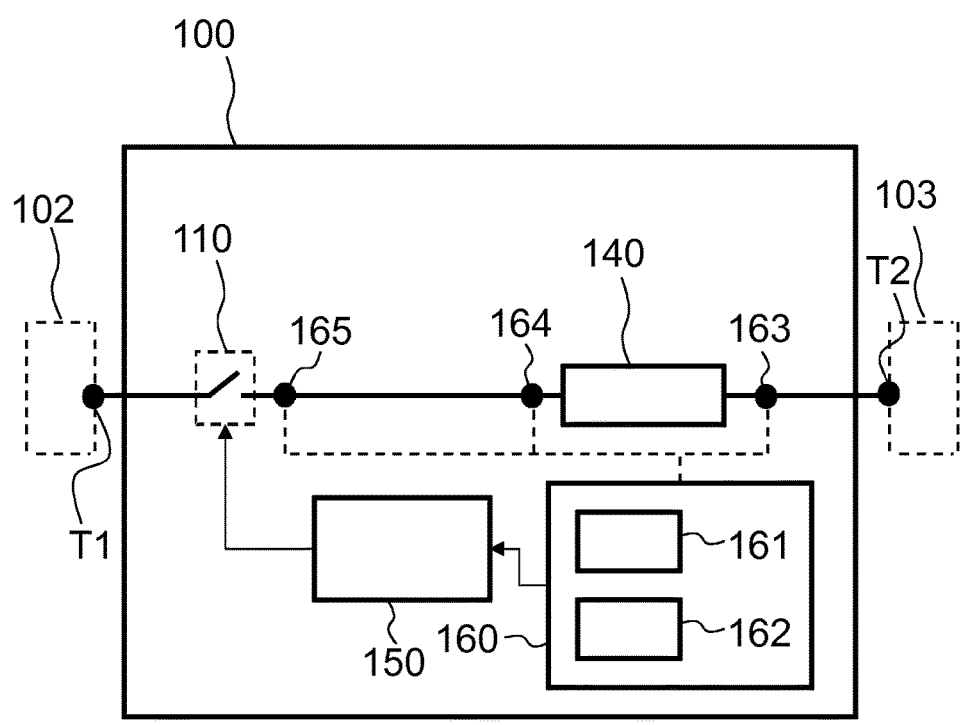
FIG. 2 is a schematic block diagram of an interface arrangement according to an embodiment of the present invention.

FIG. 2 is a schematic block diagram of an interface arrangement 100 according to an embodiment of the present invention.

The interface arrangement 100 is configured to couple an AC power system 102 with a DC power system 103, or vice versa. The interface arrangement 100 comprises at least one converter 140 for conversion of AC power to DC power, or vice versa. The at least one converter 140 comprises a DC side for coupling of the converter 140 to the DC power system 103 and an AC side for coupling of the converter 140 to the AC power system 102. The interface arrangement 100 comprises a circuit breaker, schematically indicated at 110, arranged in a current path between the AC side of the at least one converter 140 and the AC power system 102. The circuit breaker 110 is configured to controllably effect discontinuation of flow of current in the current path upon opening of contacts (not shown in FIG. 2) of the circuit breaker 110.

The interface arrangement 150 comprises a fault sensing unit 160 configured to sense a fault occurring in the interface arrangement 100, and a control and processing module 150 communicatively coupled to the fault sensing unit 160.

In accordance with the embodiment of the present invention illustrated in FIG. 2, the fault sensing unit 160 includes a current sensing unit which comprises a first current sensor 161 configured to sense a current at the DC side, or DC bus, of the converter 140, as indicated at 163, and/or at the AC side, or AC bus, of the converter 140, as indicated at 164. The current sensing unit further comprises a second current sensor 162 configured to sense a current at a different position than the first current sensor 161, between the AC power system 102 and the DC side, or DC bus, of the converter 140, as indicated at 165. For example, position 165 may be (substantially) at or close to a transformer's (not shown in FIG. 2) converter 140 side. The transformer may for example be arranged between the circuit breaker 110 and the converter 140. Such a transformer may comprise a primary side for coupling of the transformer to the AC power system 102 and a secondary side for coupling of the transformer to the converter 140, and with the circuit breaker 110 being arranged in a current path between the transformer and the AC power system 102.

The control and processing module 150 is configured to control operation of the circuit breaker 110 at least with respect to opening of the circuit breaker 110. The control and processing module 110 is configured to open the contacts of the circuit breaker 110 if there is determined (by the fault sensing unit 160) that there is a fault occurring in the interface arrangement 100.

The control and processing module 150 is configured to, if a fault in the interface arrangement 100, as sensed by the fault sensing unit 160, occurs within a predefined portion of the interface arrangement 100, delay opening of the contacts of the circuit breaker 110 by a selected delay time period, compared to if the fault would have been within a portion of the interface arrangement 100 different from the predefined portion.

In one or more embodiments of the present invention, the predefined portion of the interface arrangement 100 may for example comprise a current path between the secondary side of the transformer and the AC side, or AC bus, of the converter 140.

The control and processing module 150 illustrated in FIG. 2, or a control and processing module according to any other embodiment of the present invention, may include or be constituted for example by any suitable central processing unit (CPU), microcontroller, Digital Signal Processor (DSP), Application Specific Integrated Circuit (ASIC), Field-Programmable Gate Array (FPGA), etc., or any combination thereof. The control and processing module may optionally be capable of executing software instructions stored in a computer program product e.g. in the form of a memory. The memory may for example be any combination of Random Access Memory (RAM) and Read-Only Memory (ROM). The memory may comprise persistent storage, which for example can be a magnetic memory, an optical memory, a solid state memory or a remotely mounted memory, or any combination thereof.

It is to be understood that various components which are not illustrated in FIG. 2 may be included in the interface arrangement 100. Such components, which thus are not shown in FIG. 2, may for example include resistors, capacitors, filters, additional transformers and/or other auxiliary elements.

Figure 3:
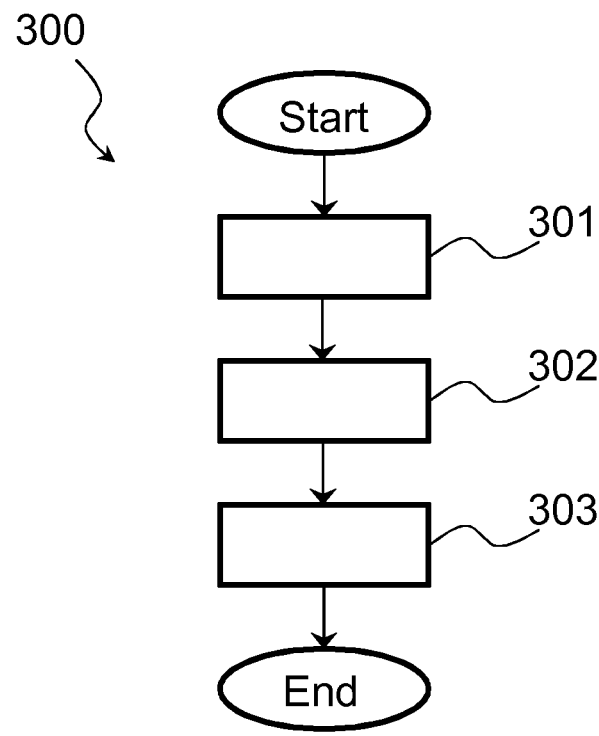
FIG. 3 is a schematic flow chart of a method according to an embodiment of the present invention.

Referring now to FIG. 3, there is shown a schematic flowchart of a method 300 according to an embodiment of the present invention. The method 300 is for use in an interface arrangement such as the interface arrangement 100 described in the foregoing with respect to FIG. 1 or 2. The interface arrangement is configured to couple an AC power system with a DC power system, or vice versa. The interface arrangement comprises at least one converter for conversion of AC power to DC power, or vice versa. The at least one converter comprises a DC side for coupling of the converter to the DC power system and an AC side for coupling of the converter to the AC power system. The interface arrangement comprises a circuit breaker arranged in a current path between the AC side of the at least one converter and the AC power system. The circuit breaker is configured to controllably effect discontinuation of flow of current in the current path upon opening of contacts of the circuit breaker.

In accordance with the method 300, a fault occurring in the interface arrangement is sensed, 301. Operation of the circuit breaker is controlled at least with respect to opening of the circuit breaker, 302, wherein the contacts of the circuit breaker are opened if there is determined to be a fault occurring in the interface arrangement. If a fault in the interface arrangement is sensed to occur within a predefined portion of the interface arrangement, opening of the contacts of the circuit breaker is delayed, 303, by a selected delay time period, as compared to if the fault would have been within a portion of the interface arrangement different from the predefined portion.

Figure 4:
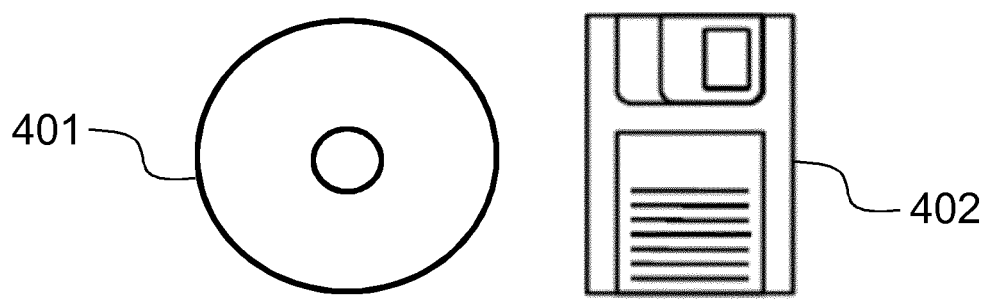
FIG. 4 is a schematic view of computer-readable means carrying computer program code, according to embodiments of the present invention.

Referring now to FIG. 4, there is shown a schematic view of computer-readable means 401, 402 carrying computer program code according to embodiments of the present invention. The computer-readable means 401, 402 or computer program code is configured to be executed in a control and processing module according to an embodiment of the present invention, such as a control and processing module 150 as described above with reference to FIG. 2.

For example with reference to FIG. 2, the computer-readable means 401, 402 or computer program code is configured to be executed in a control and processing module 150 for use in an interface arrangement 100. The interface arrangement 100 is configured to couple an AC power system 102 with a DC power system 103, or vice versa. The interface arrangement 100 comprises at least one converter 140 for conversion of AC power to DC power, or vice versa. The at least one converter 140 comprises a DC side for coupling of the converter 140 to the DC power system 103 and an AC side for coupling of the converter 140 to the AC power system 102. The interface arrangement 100 comprises a circuit breaker, schematically indicated at 110, arranged in a current path between the AC side of the at least one converter 140 and the AC power system 102. The circuit breaker 110 is configured to controllably effect discontinuation of flow of current in the current path upon opening of contacts of the circuit breaker 110. The interface arrangement 150 comprises a fault sensing unit 160 configured to sense a fault occurring in the interface arrangement 100. The fault sensing unit 160 is communicatively coupled to the control and processing module 150.

The computer-readable means 401, 402 carry computer program code configured to, when executed in the control and processing module 150, control operation of the circuit breaker 110 at least with respect to opening of the circuit breaker 110, wherein the contacts of the circuit breaker 110 are opened if there is determined to be a fault occurring in the interface arrangement 100. The computer program code is configured to, when executed in the control and processing module 150, if a fault in the interface arrangement 100 as sensed by the fault sensing unit 150 occurs within a predefined portion of the interface arrangement 100, delay opening of the contacts of the circuit breaker 110 by a selected delay time period, as compared to if the fault would have been within a portion of the interface arrangement 100 different from the predefined portion.

The computer-readable means 401, 402 or computer readable storage mediums depicted in FIG. 4 include a Digital Versatile Disc (DVD) 401 and a floppy disk 402 which are non-limiting, exemplifying examples of computer-readable means 401, 402 or computer readable storage mediums according to embodiments of the present invention. Although two particular types of computer-readable means 401, 402 are depicted in FIG. 4, the present invention encompasses embodiments employing any other suitable type of computer-readable means or computer-readable digital storage medium, such as, but not limited to, a nonvolatile memory, a hard disk drive, a Compact Disc (CD), a Flash memory, magnetic tape, a Universal Serial Bus (USB) memory device, a Zip drive, etc.

In conclusion, a method and apparatuses for handling delayed zero crossing in fault current through a circuit breaker are disclosed. An interface arrangement is configured to couple an AC power system with a DC power system, or vice versa. The interface arrangement comprises at least one converter for conversion of AC power to DC power, or vice versa, which comprises a DC side for coupling of the converter to the DC power system and an AC side for coupling of the converter to the AC power system. A circuit breaker is arranged in a current path between the AC side of the at least one converter and the AC power system. There may be a risk of delayed zero crossing in fault current occurring in case a fault occurs in a predefined portion of the interface arrangement. If a fault is sensed to occur in the interface arrangement within the predefined portion of the interface arrangement, opening of contacts of the circuit breaker can be delayed by a selected delay time period, compared to if the fault would have been within a portion of the interface arrangement different from the predefined portion.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An interface arrangement configured to couple an alternating current, AC, power system with a direct current, DC, power system, the interface arrangement lacking additional auxiliary equipment and comprising:
    at least one converter for conversion of AC power to DC power, wherein the at least one converter comprises a DC side for coupling of the converter to the DC power system and an AC side for coupling of the converter to the AC power system;
    a transformer comprising a primary side for coupling of the transformer to the AC power system and a secondary side for coupling of the transformer to the at least one converter;
    a multi-phase current path comprising a plurality of conductors for coupling the AC power system with the DC power system;
    a circuit breaker arranged in a current path between the transformer and the AC power system, the circuit breaker being configured to controllably effect discontinuation of flow of current in each of the plurality of conductors of the current path upon opening of contacts of the circuit breaker independently of the other ones of the plurality of conductors;
    a fault sensing unit configured to sense a fault occurring in the interface arrangement; and
    a control and processing module communicatively coupled to the fault sensing unit,
    wherein the control and processing module is configured to control operation of the circuit breaker at least with respect to opening of the circuit breaker, and wherein the control and processing module is configured to open the contacts of the circuit breaker if there is determined to be a fault occurring in the interface arrangement, and
    wherein the control and processing module is further configured to, if a fault in the interface arrangement as sensed by the fault sensing unit occurs in a current path in a predefined portion of the interface arrangement for a conductor of the plurality of conductors, delay opening of the contacts of the circuit breaker by a selected delay time period for the conductor for which a fault is sensed so as to effect discontinuation of flow of current in the conductor by a selected delay time period compared to if the fault would have been within a portion of the interface arrangement different from the predefined portion and without delay for the other conductors, and wherein the fault in the interface arrangement as sensed by the fault sensing unit is a phase to ground fault and the selected delay time period is between about 20 ms and 100 ms and the delay is implemented through the control and processing module being configured to send an instruction issued after the detection of the fault that is delayed by the selected delay time period and the predefined portion of the interface arrangement is a current path between the secondary side of the transformer and the AC side of the at least one converter.

2. A converter station configured to couple an alternating current power system with a direct current power system, the converter station comprising the interface arrangement according to claim 1.

3. A power system including an alternating current, AC, power system and a direct current, DC, power system, the power system comprising the interface arrangement according to claim 1 configured to couple the AC power system with the DC power system.

4. The interface arrangement according to claim 1, wherein the fault sensing unit comprises a current sensing unit configured to:
    sense a current at the DC side of the at least one converter and/or at the AC side of the at least one converter; and
    sense a current between the AC power system and the DC side of the at least one converter, at a different position than the sensing of current at the DC side of the at least one converter and/or at the AC side of the at least one converter.

5. The interface arrangement according to claim 4, wherein the current sensing unit comprises:

a first current sensor configured to sense a current at the DC side of the at least one converter and/or at the AC side of the at least one converter; and a second current sensor configured to sense a current at a different position than the first current sensor, between the AC power system and the DC side of the at least one converter.

6. The interface arrangement according to claim 5, wherein the fault sensing unit is configured to determine a differential current based on the currents sensed by the current sensing unit, and based on the differential current, determine that there is a fault in the interface arrangement.

7. A converter station configured to couple an alternating current power system with a direct current power system, the converter station comprising the interface arrangement according to claim 5.

8. A power system including an alternating current, AC, power system and a direct current, DC, power system, the power system comprising the interface arrangement according to claim 5 configured to couple the AC power system with the DC power system.

9. The interface arrangement according to claim 4, wherein the fault sensing unit is configured to determine a differential current based on the currents sensed by the current sensing unit, and based on the differential current, determine that there is a fault in the interface arrangement.

10. The interface arrangement according to claim 9, wherein the fault sensing unit is configured to determine that there is a fault in the interface arrangement on a condition that a magnitude of the differential current exceeds a predefined differential current threshold value for a predefined period of time.

11. A converter station configured to couple an alternating current power system with a direct current power system, the converter station comprising the interface arrangement according to claim 10.

12. A power system including an alternating current, AC, power system and a direct current, DC, power system, the power system comprising the interface arrangement according to claim 10 configured to couple the AC power system with the DC power system.

13. A converter station configured to couple an alternating current power system with a direct current power system, the converter station comprising the interface arrangement according to claim 9.

14. A power system including an alternating current, AC, power system and a direct current, DC, power system, the power system comprising the interface arrangement according to claim 9 configured to couple the AC power system with the DC power system.

15. A power system including an alternating current, AC, power system and a direct current, DC, power system, the power system comprising the interface arrangement according to claim 4 configured to couple the AC power system with the DC power system.

16. A converter station configured to couple an alternating current power system with a direct current power system, the converter station comprising the interface arrangement according to claim 4.

17. A computer program product configured to be executed in a control and processing module of an interface arrangement configured to couple an alternating current, AC, power system with a direct current, DC, power system, or vice versa, the interface arrangement lacking additional auxiliary equipment and comprising:

at least one converter for conversion of AC power to DC power, wherein the at least one converter comprises a DC side for coupling of the converter to the DC power system and an AC side for coupling of the converter to the AC power system;

a transformer comprising a primary side for coupling of the transformer to the AC power system and a secondary side for coupling of the transformer to the at least one converter;

a multi-phase current path comprising a plurality of conductors for coupling the AC power system with the DC power system;

a circuit breaker arranged in a current path between the transformer and the AC power system, the circuit breaker being configured to controllably effect discontinuation of flow of current in each of the plurality of conductors of the current path upon opening of contacts of the circuit breaker independently of the other ones of the plurality of conductors; and a fault sensing unit configured to sense a fault occurring in the interface arrangement, the fault sensing unit being communicatively coupled to the control and processing module, wherein the computer program product is embodied on a non-transitory computer readable medium and carrying computer program code configured to, when executed in the control and processing module:

control operation of the circuit breaker at least with respect to opening of the circuit breaker, wherein the contacts of the circuit breaker are opened if there is determined to be a fault occurring in the interface arrangement; and if a fault in the interface arrangement as sensed by the fault sensing unit occurs in a current path in a predefined portion of the interface arrangement for a conductor of the plurality of conductors, delay opening of the contacts of the circuit breaker by a selected delay time period for the conductor for which a fault is sensed so as to effect discontinuation of flow of current in the conductor by a selected delay time period compared to if the fault would have been within a portion of the interface arrangement different from the predefined portion and without delay for the other conductors, wherein the fault in the interface arrangement as sensed by the fault sensing unit is a phase to ground fault and the selected delay time period is between about 20 ms and 100 ms and the delay is implemented through the sending of an instruction issued after the detection of the fault that is delayed by the selected delay time period and the predefined portion of the interface arrangement is a current path between the secondary side of the transformer and the AC side of the at least one converter.

18. A method for use in an interface arrangement configured to couple an alternating current, AC, power system with a direct current, DC, power system, or vice versa, the interface arrangement lacking additional auxiliary equipment and comprising at least one converter for conversion of AC power to DC power, wherein the at least one converter comprises a DC side for coupling of the converter to the DC power system and an AC side for coupling of the converter to the AC power system, a transformer comprising a primary side for coupling of the transformer to the AC power system and a secondary side for coupling of the transformer to the at least one converter, a multi-phase current path comprising a plurality of conductors for coupling the AC power system with the DC power system, a circuit breaker arranged in a current path between the transformer and the AC power system, the circuit breaker being configured to controllably effect discontinuation of flow of current in each of the plurality of conductors of the current path upon opening of contacts of the circuit breaker independently of the other ones of the plurality of conductors, the method comprising:
sensing a fault occurring in the interface arrangement;
controlling operation of the circuit breaker at least with respect to opening of the circuit breaker, comprising opening the contacts of the circuit breaker if there is determined to be a fault occurring in the interface arrangement; and
if a fault in the interface arrangement is sensed to occur in a current path in a predefined portion of the interface arrangement for a conductor of the plurality of conductors, delaying opening of the contacts of the circuit breaker by a selected delay time period for the conductor for which a fault is sensed so as to effect discontinuation of flow of current in the conductor by a selected delay time period compared to if the fault would have been within a portion of the interface arrangement different from the predefined portion and without delay for the other conductors,
wherein the fault in the interface arrangement as sensed by the fault sensing unit is a phase to ground fault and the selected delay time period is between about 20 ms and 100 ms and the delay is implemented through the sending of an instruction issued after the detection of the fault that is delayed by the selected delay time period and the predefined portion of the interface arrangement is a current path between the secondary side of the transformer and the AC side of the at least one converter.

* * * * *